Jan. 8, 1924.  
A. S. VOGT  
1,480,033  
DASHPOT PLUNGER  
Filed Jan. 12, 1923
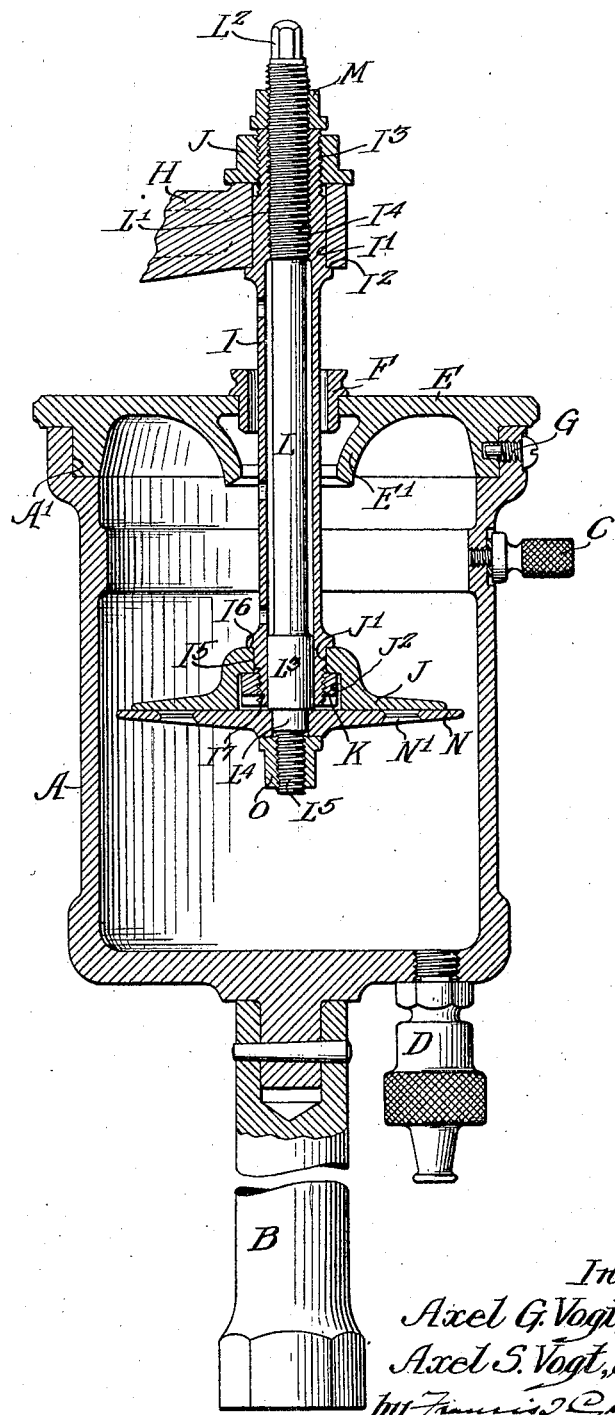
Inventor.  
Axel G. Vogt, Executor.  
Axel S. Vogt, deceased  
his Attorney.

Patented Jan. 8, 1924.

1,480,033

UNITED STATES PATENT OFFICE.

AXEL S. VOGT, DECEASED, LATE OF PHILADELPHIA, PENNSYLVANIA; BY AXEL G. VOGT, EXECUTOR, OF DETROIT, MICHIGAN.

DASHPOT PLUNGER.

Application filed January 12, 1923. Serial No. 612,315.

*To all whom it may concern:*

Be it known that AXEL S. VOGT, deceased, late a citizen of the United States of America, residing in the city and county of Philadelphia, in the State of Pennsylvania, invented certain new and useful Improvements in Dashpot Plungers, of which the following is a true and exact description, reference being had to the accompanying drawings, which form a part thereof.

My invention relates to dash pots and is particularly designed and adapted for use in connection with railroad track scales and to prevent an unduly rapid motion of the scale beam under the rapidly varying loads to which such scales are exposed, although it is obviously well adapted for use for any purposes which involve the use of dash pots. The object of my invention is to provide a simple and efficient means for adjusting the resistance met with by the dash pot plunger in its restriction in the dash pot cylinders.

The nature of my improvement will be best understood as described in connection with the drawing which is a sectional elevation of a dash pot and a dash pot plunger embodying my invention, and in which—

A is the dash pot cylinder having a shouldered upper end, as indicated at $A'$, for a removable head and secured, as shown, to a standard indicated at B. C is the ordinary oil level gauge and D a cock through which the oil can be conveniently drawn from the cylinder. E is the head or cover of a dash pot cylinder fitting in the seated end $A'$ and secured in place, as shown, by a screw G. The central part of the head or cover is perforated, fitted with a bushing, as indicated at F, and round the perforation the metal of the cover or head is flared downward, as indicated at $E'$. These features of construction of the head are adapted to prevent as far as possible oil being thrown out of the cylinder but they form no part of my invention. H indicates a bracket which, as I have used it, is secured to the end of a scale beam and which is secured to the tubular plunger actuating rod I fitting, as shown, round a cylindrical portion $I'$ of the rod and being held in place between a shoulder $I^2$ and a clamping nut J screwing on a threaded portion $I^3$ of the rod I. The upper portion of the tubular rod I is threaded, as indicated at $I^4$; at the lower end of the tubular rod I is formed a cylindrical seat $I^5$ and shoulder $I^6$, the rod being externally threaded, as indicated at $I^7$, below the seat $I^5$. J is a disk having a seat portion $J'$ which fits on the seat $I^5$ and against the shoulder $I^6$ and chambered out on its under seat, as indicated at $J^2$. K is an annular nut screwing on the threaded portion $I^7$ of the rod I so as to clamp the disk J against the shoulder $I^6$. L is a longitudinally movable rod having an upper threaded portion $L'$ which screws into the threaded portion $I^4$ of the tubular rod and an outer end preferably of angular form, as indicated at $L^2$, which extends beyond the tubular rod I. At its lower or inner end the rod L fits in the lower portion of the tubular rod I, as shown at $L^3$, and is formed with a contracted tubular seat $L^4$ having a threaded extension, as indicated at $L^5$. M is a clamping nut screwing on the upper threaded end of the rod L. N, a disk of somewhat greater diameter than the disk J, clamped on the end of the rod L by a nut O screwing on its threaded end $L^5$, as shown. The disk N is formed with any desired number of perforations extending through it from face to face, as indicated at $N'$ and I would here note that whichever one of the disks J or N is the larger in diameter is the one through which the perforations should be formed, the operation being exactly the same in either case as will be clearly understood.

The resistance met with by the dash pot plunger in its up and down movements in the cylinder depends, of course, upon the area of the passage left for the flow of oil round the plunger. This, when the two disks J and N are clamped together, is the area of the annular space between the wall of the dash pot cylinder and the edge of the larger disk. If it is found that too much resistance exists it is only necessary to separate the two disks slightly, whereupon the oil can flow not only round the edge of the larger disk but also through the perforations in the larger disk and thence through the space between the two disks and it will be obvious that by making the two disks adjustable with reference to each other a very nice adjustment of the resistance can be effected. It will also be obvious that in the construction which I have illustrated the adjustment can be easily made any time by rotating the rod L and thereby screwing it in or out in the tubular actuating rod with, of course, a corresponding movement of the disk N toward or away from the disk J.

Having now described my invention, what I claim as new and desire to secure by Letters Patent, is:

1. A dash pot plunger comprising in combination an actuating rod, a disc of greater diameter than the rod secured in fixed position on said rod, a second disc also of greater diameter than the rod adapted to fit on the face of the fixed disc, one of said discs being of larger diameter than the other and formed with a plurality of perforations extending through its portion which extends beyond the rod, and means for adjustably securing the second disc to the rod so as to shift the second disc from and to a position in which it contacts with the first disc.

2. A dash pot plunger comprising in combination a tubular actuating rod, a disc secured in fixed position on the end of said rod, a rod screwing into the inside of the tubular rod so as to be longitudinally adjustable therein and having its outer end extending beyond the outer end of the tubular rod and a disc secured to the inner end of the adjustable rod and movable with it to and from a position in which it contacts with the fixed disc, one of said discs being of larger diameter than the other and having perforations formed through it through which oil can flow when the discs are separated.

AXEL G. VOGT,
*Executor of Axel S. Vogt, deceased.*